Sept. 11, 1923.
V. BENDIX
ENGINE STARTER
Filed June 9, 1919
1,467,602
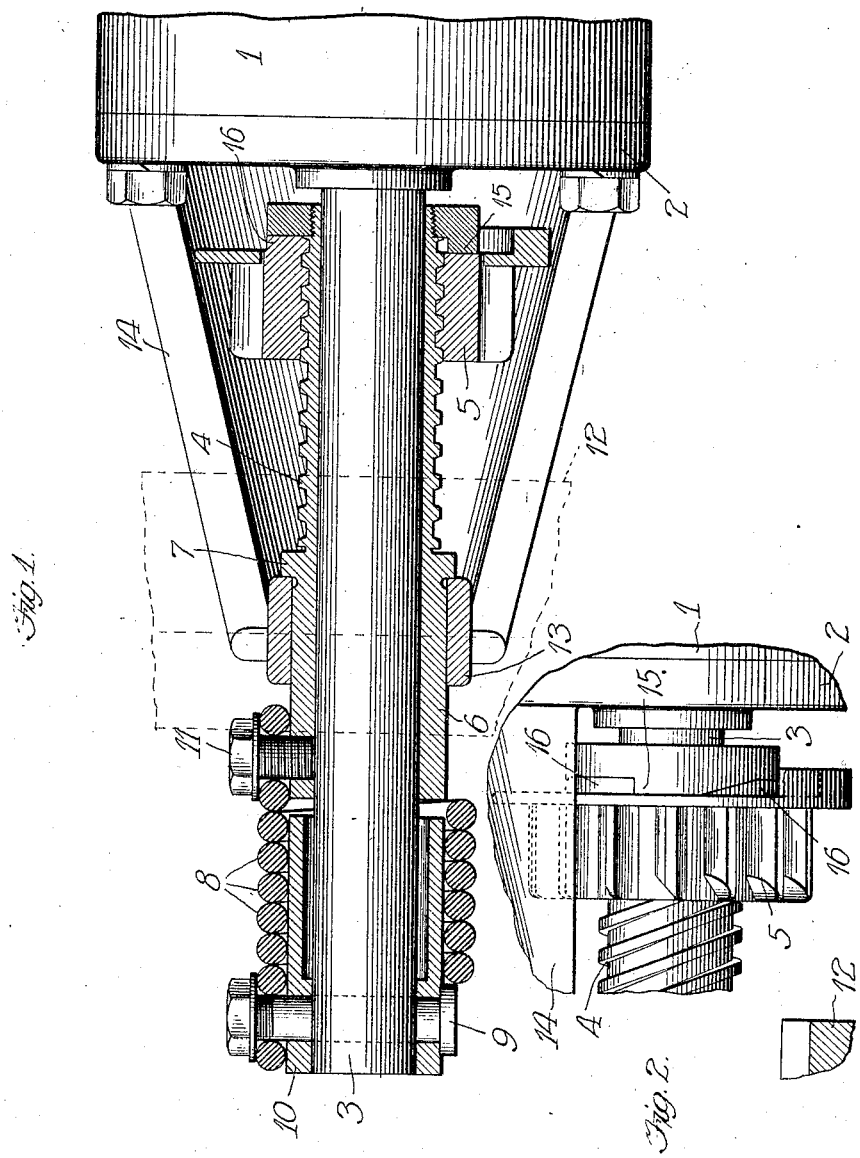

Patented Sept. 11, 1923.

1,467,602

UNITED STATES PATENT OFFICE.

VINCENT BENDIX, OF CHICAGO, ILLINOIS.

ENGINE STARTER.

Application filed June 9, 1919. Serial No. 302,787.

*To all whom it may concern:*

Be it known that I, VINCENT BENDIX, a citizen of the United States, residing at Chicago, in the county of Cook and State of Illinois, have invented certain new and useful Improvements in Engine Starters, of which the following is a specification.

My invention relates to a starter for gas engines and the like, and the object thereof is to provide a simple, efficient and reliable means for transmitting the power of the starting motor or other source of power to the engine to be started, such means being known as the drive or transmission of an engine starter system.

The drive or transmission in which my invention is embodied is of the type known as the Eclipse-Bendix drive, which is characterized by a rotatable member such as a screw shaft driven by the motor and a driving member mounted thereon for longitudinal movement on the screw shaft and for rotary movement therewith, whereby when the screw shaft is rotated the pinion will be automatically advanced into operative or driving engagement with a member connected either directly or indirectly with the engine, such pinion being automatically demeshed or disengaged when the engine starts on its own power.

My invention relates to certain improvements and details of construction, more particularly in respect to the screw shaft and the mounting or support thereof, such support being in the present instance towards the outer end of the screw shaft and substantially midway of the entire drive structure. While I have selected a direct type of drive, it will be understood that my invention is also applicable to the indirect type.

My invention embodies other features of novelty and utility which will be apparent from the description hereinafter given.

In the drawing Fig. 1 is a sectional elevation looking upwardly of a starting system showing a drive or transmission embodying my invention; and Fig. 2 a detail view of the pinion and the stop nut at the retracted position of such pinion.

Referring to the particular embodiment of my invention as herein shown, the source of power which is here an electric motor indicated at 1 has an end plate 2 through which passes a driving shaft 3. In the present instance this shaft, being direct driven by the motor, constitutes the extended armature shaft of such motor. Upon this driving shaft, towards the inner portion thereof, is mounted the hollow screw shaft 4 provided with the usual screw threads on which is screw-threaded the driving member or pinion 5. The inner end portion only of the screw shaft is provided with screw threads, the outer portion thereof being plain as indicated at 6. This plain portion and screw-threaded portion are separated by a collar or annular portion 7 which is of slightly greater diameter than said plain portion 6.

The driving shaft 3 is operatively connected with the screw shaft, preferably by a yielding driving connection, such as a coiled spring 8, one end of which is anchored by the bolt 9 to a driving head 10 and thereby to the shaft 3, and at its other end to the plain portion 6 of the screw shaft by means of the stud 11.

The drive is of that type in which the pinion moves outwardly away from the motor when operated so as to be advanced into mesh with the flywheel as shown at 12, and in order to support this drive or transmission structure I provide a bearing bracket consisting of a sleeve 13 encircling the plain portion 6 of the screw shaft and connected by means of the semi-housing 14 with the end plate 2 of the motor, such housing being open from below.

Suitable stops are provided for the pinion on its return to home position as shown. A stop collar 14 is screwed onto the inner end of the screw shaft. This collar has a series of right angled teeth or shoulders 15 with which corresponding teeth or shoulders 16 abut when the pinion is in its normal position as shown in Fig. 2.

The screw shaft is permitted to move to the right in a longitudinal direction, against the tension of the coiled spring, thereby providing a yielding longitudinal movement to take care of end to end abutment of pinion teeth and flywheel teeth.

Describing a cycle of operation and starting with the parts in the normal position shown, the rotation of the armature shaft 3 by the motor will be transmitted through the yielding connection to the screw shaft which is thereby rotated. As a result the pinion 5 will be automatically advanced longitudinally of the screw shaft towards the left in Fig. 1, and will enter into mesh with the fly wheel 12. When the pinion reaches its limit of travel to the left it will partake of the rotary movement of the screw shaft with the result that the fly wheel will be rotated. When the engine has started on its own power the pinion will be automatically demeshed and returned to the normal position shown.

If the pinion teeth and the flywheel teeth should abut end to end, the screw shaft will yield and move longitudinally to the right against the action of the coiled spring which then becomes extended. When the pinion rotates slightly, proper register and mesh is obtained and the screw shaft moves back longitudinally to normal position with its collar 7 against sleeve 13.

The described construction attains several advantages, first in that it dispenses with the use of an outboard bearing, that is, a bearing at the outer end of the shaft 3 in those drives which are known as of the outboard type in which the pinion in the meshing operation moves outwardly away from the motor. In certain installations it happens that the clearances do not permit of the provision of such an outboard bearing which generally requires the use of an extended housing or the like carrying a bearing of that kind; second, in that it provides a supporting bearing for the screw shaft practically immediately adjacent the pinion when it is in its driving position in mesh with the fly wheel; and third, in that it takes care of installations where the inboard mesh is a requisite, that is, where the inward movement of the pinion towards the fly wheel when going into mesh is required, but it is impossible to provide the necessary clearance for the standard inboard type of construction or where it is impossible to alter the fly wheel.

I claim:

1. An engine drive structure comprising a driving shaft, a driven shaft mounted thereon and operatively connected therewith, a driving member mounted on said driven shaft for longitudinal movement thereof and rotary movement therewith, said rotatable shaft having a plain portion at one end, a bearing sleeve for said plain portion, the latter being capable of an endwise sliding movement through said sleeve which is located at an intermediate portion of said structure, and a stop formed on said driven shaft for limiting the longitudinal movement of said driving member in one direction and adapted to engage said sleeve to prevent endwise movement of the driven shaft in one direction.

2. An engine drive structure comprising a driving shaft, a driven shaft operatively connected therewith, a driving member mounted on said driven shaft for longitudinal movement thereof and rotary movement therewith, a bearing sleeve engaging said driven shaft intermediate the ends of the latter, said driven shaft being capable of a limited longitudinal movement through said sleeve, and means formed on said driven shaft intermediate the ends thereof for limiting the longitudinal movement of said pinion and said driven shaft in one direction.

VINCENT BENDIX.